United States Patent [19]
Dohogne

[11] 4,316,394
[45] Feb. 23, 1982

[54] MAGNETICALLY SUSPENDED FREE ROTOR GYROSCOPE

[75] Inventor: James R. Dohogne, Phoenix, Ariz.
[73] Assignee: Sperry Corporation, New York, N.Y.
[21] Appl. No.: 120,203
[22] Filed: Feb. 11, 1980
[51] Int. Cl.³ .................................... G01C 19/24
[52] U.S. Cl. ............................ 74/5.46; 74/5.6 E; 308/10
[58] Field of Search ............... 308/10; 73/504; 74/5.46, 5.6 E, 5.4

[56] References Cited
U.S. PATENT DOCUMENTS

| | | | |
|---|---|---|---|
| 2,719,291 | 9/1955 | Wing | 74/5 R X |
| 2,856,240 | 10/1958 | Breazeale et al. | 74/5.46 X |
| 3,428,371 | 2/1969 | Lyman | 308/10 |
| 3,473,852 | 10/1969 | Lyman | 308/10 |
| 3,529,477 | 9/1970 | Quermann | 74/5 F |
| 3,791,704 | 2/1974 | Perper | 308/10 |
| 3,976,339 | 8/1976 | Sabnis | 308/10 |
| 4,167,296 | 9/1979 | Dendy | 74/5.46 X |
| 4,211,452 | 7/1980 | Poubeau | 74/5.46 X |
| 4,212,443 | 7/1980 | Duncan et al. | 73/504 X |
| 4,222,270 | 9/1980 | Allen | 73/504 |

FOREIGN PATENT DOCUMENTS 630711 10/1978 U.S.S.R. ............................ 308/10

Primary Examiner—Rodney H. Bonck
Attorney, Agent, or Firm—Howard P. Terry

[57] ABSTRACT

A gyro rotor is freely suspended in a housing for simultaneous rotation about a spin axis and a pair of precession axes in turn orthogonal to the spin axis, by a pair of magnetic suspensions spaced along the spin axis. Each magnetic suspension comprises a magnetically permeable stator member and a cooperative magnetically permeable rotor member relatively arranged so as to define axially spaced annular magnetically permeable gaps. Each magnetic suspension includes a permanent magnet for producing a fixed or passive magnetic flux in each gap and an electromagnet coil for producing a controllable or active magnetic flux in each gap. The passive flux provides passive stabilized suspension of the rotor parallel to two of said axes, while the active flux provides active stabilized suspension of the rotor parallel to the third of said axes using a closed servo loop. The ratio of the axial distance between the annular magnetic gaps to the diameter thereof is such that the rotor tends to maintain its position upon tilt thereof; that is, the gyro exhibits substantially zero restoring spring rates about its sensing axes. By means of closed loop servo techniques including angular pick-offs and torquers, measures of rates of turn are provided in terms of torquer currents required to maintain the angular pick-off outputs at null values.

9 Claims, 8 Drawing Figures

MAGNETICALLY SUSPENDED FREE ROTOR GYROSCOPE

CROSS REFERENCE TO RELATED APPLICATION

The present application is related to the co-pending U.S. patent application Ser. No. 120,202, filed concurrently herewith in the name of C. G. Sutter, entitled "Torquer Apparatus for Magnetically Suspended Members", and assigned to Sperry Corporation

BACKGROUND OF THE INVENTION

1. Field of the Invention

The present invention relates generally to angular rate sensors and more particularly to inertial gyroscopes in which the rotor is freely suspended relative to a housing for spinning about a spin axis and is adapted to measure the angular rates of motion of its housing about a pair of orthogonal precession axes, in turn orthogonal to the rotor spin axis. The suspension of the rotor is accomplished using magnetic suspension techniques without physical contact of the rotor with stationary parts of the instrument. In accordance with the invention, the magnetic suspension dimensional parameters are so determined as to achieve substantially zero cross-axis spring rates, whereby very precise input rates may be measured by using torque feed back techniques to maintain the gyro rotor continuously at its null location.

2. Description of the Prior Art

Prior art force or torque feed back angular rate gyroscopic sensors have employed a variety of techniques for achieving a substantially frictionless, neutral spring suspension of the sensitive gyroscope rotor. Typical arrangements are shown in the W. G. Wing U.S. Pat. No. 2,719,291 for a "Rate of Turn Gyroscope", issued Sept. 27, 1955, and in the T. R. Quermann U.S. Pat. No. 3,529,477 for a "Gyroscopic Rotor Suspension", issued Sept. 22, 1970, both assigned to Sperry Corporation. In the Quermann patent, for example, the rotor is suspended on the end of a ball-bearing-journalled, motor-driven shaft by means of a complex system of flexures which tend to provide a substantially zero cross-axis spring rate. Another typical arrangement is represented by the dynamically tuned gimbal suspension, one configuration of which is illustrated in the present assignee's pending application Ser. No. 11,965, filed Feb. 14, 1979 in the name of D. H. Duncan for a "Flexure Assembly for Dynamically Tuned Gyroscopes". All of these flexures are complex, delicate and difficult to fabricate, to assemble, to adjust, and to calibrate and are therefore costly. The calibration is subject to long term drift due to the effects of temperature variations, material stress and strain, vibration, and the like. Other suspension techniques have employed fluid bearing suspensions and expensive electrically and mechanically complex electrostatic suspensions. In most known arrangements, the life and, particularly, reliability are compromised and are limited because of electrical and mechanical complexity and because of mechanically contacting elements and attendant lubrication systems. These life and reliability limitations make the use of such prior art devices in such applications as attitude references for aircraft, satellites, and other long life space vehicles undesirable. With the present invention there is normally no physical contact between rotor and stator portions of the suspension system, obviating the need for lubrication systems; the invention provides a mechanically and electronically simple free rotor suspension system.

Magnetic suspensions for gyroscope rotors have received considerable attention recently, particularly in connection with gyroscopes for use in space vehicles and satellites where their non-contacting and inherently frictionless suspension characteristic contribute to extremely long life expectancy, limited only by the inherently long life expectancy of their associated electronic control systems. Typical magnetic suspensions for gyroscopic rotors are disclosed in the A. V. Sabnis U.S. Pat. No. 3,976,339 for a "Magnetic Suspension Apparatus" issued Aug. 24, 1976 and in the J. R. Dohogne, A. V. Sabnis U.S. Pat. No. 4,090,745 for a "Magnetic Suspension Apparatus with Magnetic Stiffness Augmentation", issued May 23, 1978, both assigned to Sperry Corporation. The teachings of these patents include magnetic suspensions of the radially passive, axially active type wherein the primary rotor load is supported and stably positioned by permanent or passive magnet fields in two substantially spaced radial planes, while the rotor axial position is inherently unstable and is rendered stable by means of a closed-loop servo-controlled electromagnetic field. The substantially widely spaced radially passive, axially active suspensions supporting the gyroscope rotor centrally therebetween, inherently provide the rotor with positive angular stiffness. That is, the two magnetic suspension radial stiffnesses behave like physical springs which oppose any angular motion of the spinning rotor; i.e., a long effective lever arm through which the passive magnetic forces act. This is a desirable characteristic in magnetically suspended reaction wheels, as is discussed by Sabnis et al. While the disclosed systems provide positive stiffness with respect to angular forces, they can be made to exhibit negative stiffness and immediately become angularly unstable.

Other known related configurations demonstrate positive stiffness, such as magnetic suspensions for momentum wheels, reaction wheels, or energy storage wheels for space craft stabilization. A typical magnetically suspended rotary inertial ring-shaped rotor is disclosed in the U.S. Pat. No. 4,000,929 to Studer, which employs a large diameter-to-length ratio of about seven to one to achieve positive angular stiffness and has active and passive suspension elements so located in relation to the ring rotor as to provide active magnetic stabilization forces on the ring rotor along mutually perpendicular diameters of the ring and passive magnetic stabilization with respect to its other axes of freedom. In this axially passive, radially active suspension system, for circumferentially spaced, diametrically opposite suspension stations are provided, the passive suspension forces restraining axial displacement of the ring as well as angular motion of the ring about axes orthogonal to the spin axis. Active magnetic stabilization is provided to maintain the ring rotor fixed radially relative to the stations. Thus, this axially (and angularly) passive, radially active suspension also provides positive stiffness opposing angular motion of the ring about axes perpendicular to the spin axis.

In the foregoing classes of magnetically suspended rotors, the geometric construction parameters and the magnetic flux paths are employed to provide quite substantial rigidity to disturbing torques acting on the spinning rotor. While they succeed in providing properties desirable for use in spinning-mass vehicles for their stabilization and control, they do not provide the desirable zero or substantially zero spring rate characteristics required for precision torque balanced, rate sensing gyroscopes.

SUMMARY OF THE INVENTION

The design of magnetic suspension systems for use in precision rate of turn inertial gyroscopic instruments is optimized according to the present invention so that the effective stiffness of the transverse angular spring represented by the magnetic suspension itself is zero or substantially zero. The delicate mechanical compensation strut or dynamically turned gimbals used previously to achieve a substantially zero cross-axis spring rate in ball bearing supported rotors is eliminated, and no other elements making contact between normally rotating and stationary parts of the instrument are required. As will be further discussed herein, the angular stiffness $K_\alpha$ may be made substantially zero for a cylindrical rotor with radially passive, axially active or radially active, axially passive magnetic bearings, by making the mean axial distance between the axially spaced bearing gaps have a predetermined ratio to the mean effective radius of the annular spaced magnetic ring gaps. The predetermined ratio may vary from 2:1 to 10:1 depending upon the ratio of the axial unbalance stiffness to the radial unbalance stiffness of the magnetic suspension. For radially passive, axially active types of suspensions, the ratio will be about 2:1.

DESCRIPTION OF THE PREFERRED EMBODIMENTS

In an inertial reference system employing precision rate of turn gyroscopes, it is important that the support elements for the spinning gyro rotor exert no coercive forces at right angles to the rotor over its operating range. This is achieved by making the effective suspension elements have substantially zero restoring stiffness to disturbing angular forces. The instantaneous angular position of the spinning rotor is then readily controlled through the use of a feed back loop including pick-off elements, amplifiers, and torquers; the angular displacement of the rotor with respect to the rotor casing being kept very small so that the restoring torquing currents provide measures of the rates of turning of the craft-mounted instrument casing. According to the present invention, such desirable free rotor characteristics are achieved using a magnetically supported free gyroscope rotor that normally never contacts stationary parts of the instrument. In the present invention, the rotor-magnetic suspension combination is selected to provide the desired neutral or zero angular stiffness with respect to any angular case motion caused by a corresponding angular motion of the craft to which the case is strapped. The result is accomplished by a geometric design having a predetermined relation involving the axial distance or span between the space flux gaps and the mean effective radius of the flux gaps.

Figure 1:
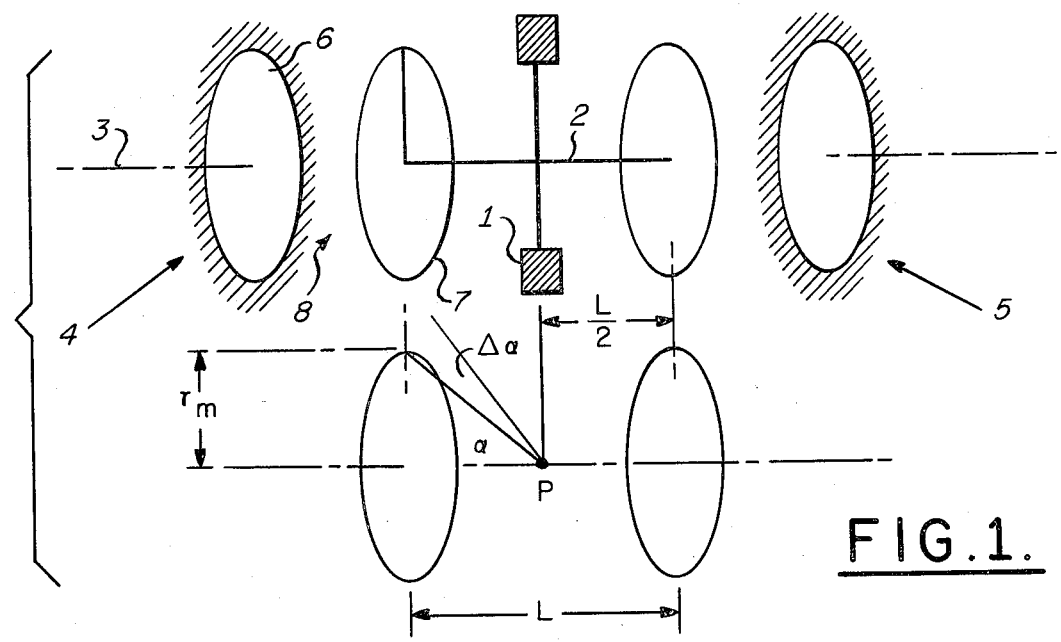
FIG. 1 is a schematic representation of a radially passive, axially active magneic suspension.

Referring briefly to FIG. 1, there is schematically illustrated a gyroscopic rotor 1 mounted on an axial support shaft 2 adapted to be spun by suitable motor means, not shown in this illustration, about spin axis 3. Rotor 1 and shaft 2 are suspended by a pair of axially spaced, annular magnetic suspensions 4 and 5 each comprising a fixed annular ring structure 6 and corresponding annular ring structure 7 fixed to and rotatable with rotor 1 and shaft 2 and adapted to define an axial magnetically permeable gap 8. As will be further described, the fixed or stator annular ring structure includes permanent magnets and electromagnets and suitably configured pole pieces which cooperate with corresponding pole pieces on ring structure 7 providing a magnetic return path for the suspending magnetic flux generated by the stator structure. As will also be further described in connection with one embodiment of the invention, the axial permanent magnetic flux in the gap 8 provides passive radial stabilization of rotor 1 while the electromagnetic flux in gap 8 provides axial stabilization of rotor 1 through a closed loop feed back system as described in the aforementioned Sabnis patent. The structural details are eliminated from FIG. 1 for simplifying the understanding of the following derivation of the mathematical relationships employed to achieve a neutral angular stiffness suspension of the rotor 1 in accordance with the present invention. In this derivation, the following definitions apply:

L = the mean effective distance or span between the magnetic gaps,
R = the mean effective radius of the annular gaps,
$\alpha$ = the angular rototion of shaft 2 about point P,
$\phi$ = the angular rotation of shaft 2 about axis 3,
$K_r$ = the radial magnetic stiffness of each magnetic suspension, and
$K_u$ = the axial magnetic stiffness of each magnetic suspension.

Referring again to FIG. 1, under the rotation $\Delta\delta$ about P, the maximum radial displacement is:

$$\Delta r = \tfrac{1}{2} L d\Delta\alpha \tag{1}$$

and the total restoring torque is:

$$T_1 = \tfrac{1}{2} K_r L^2 \Delta\alpha \tag{2}$$

where $K_r$ denotes the radial stiffness for each bearing.

The axial displacement at the magnetic gap may be written:

$$\Delta z = R\Delta\alpha(1 - \cos\phi) \tag{3}$$

and the change in the axial unbalance force acting on an element of width $R\Delta\alpha$ is:

$$dF_z = \frac{K_u R}{2\pi} \Delta\alpha (1 - \cos\phi) d\phi \tag{4}$$

The unbalance torque is therefore:

$$T_2 = \frac{K_u R^2 \Delta \alpha}{2\pi} \cdot 8 \int_0^{\pi/2} \cos\phi (1 - \cos\phi) d\phi \quad (5)$$

or $$T_2 = \frac{4 K_u R^2 \Delta \alpha}{\pi} \left[ 1 - \frac{\pi}{4} \right] \quad (6)$$

For angular stability:

$$T_1 - T_2 \geqq 0 \quad (7)$$

or $$\frac{L}{R} \geqq \left[ \frac{2K_u}{K_r} \left( \left( \frac{4}{\pi} - 1 \right) \right) \right]^{\frac{1}{2}} = .739 \sqrt{\frac{K_u}{K_r}} \quad (8)$$

Equation (8) expresses the limitation on axial spacing between bearings for the three-dimensional system. For a typical case of $K_u/K_r = 9$ (where soft iron concentric rings are used):

$$L \geqq 2.218 R \quad (9)$$

The angular stiffness for L satisfying Equation (8) is:

$$K_\alpha = \tfrac{1}{2} K_r L^2 - K_u R^2 \left[ \frac{4}{\pi} - 1 \right] \quad (10)$$

Equation (10) thus defines the angular stiffness of the magnetic suspension. If a very high angular stiffness is desired, as in the foregoing Sabnis patent, the L/R ratio is designed to be large; if low angular stiffness is desired, the L/R ratio is designed to be small. In accord with the teachings of the present invention, an L/R ratio of zero or approximately zero is desired so as to provide the zero or approximately zero angular stiffness for a force or torque rebalanced rate sensor. Accordingly, $K_\alpha$ is desired to be zero and substituting this value of $K_\alpha$ in Equation (10) yields:

$$K_r L^2 = 2 \left( \frac{4}{\pi} - 1 \right) K_u R \quad (11)$$

Solving for L/R:

$$L/R = \left[ 2 \left( \frac{4}{\pi} - 1 \right) \frac{K_u}{K_r} \right]^{\frac{1}{2}} \quad (12)$$

In a magnetic suspension of the general type illustrated by Sabnis or Studer in which soft iron concentric rings are employed, a typical value of the $K_u/K_r$ ratio may be on the order of 8 and, for this stiffness ratio, the L/R ratio for zero angular stiffness is approximately 2:1. It will be appreciated from the foregoing relationship that the L/R ratio for zero or substantially zero angular stiffness depends upon the characteristic of the magnetic suspension in terms of its $K_u/K_r$ ratio. In the preferred embodiment of the present invention, the value of these ratios is on the order of 8 or 9. Other configurations may be selected to have different ratio values with a resultant different L/R design ratio as defined by Equation (12).

Figure 2:
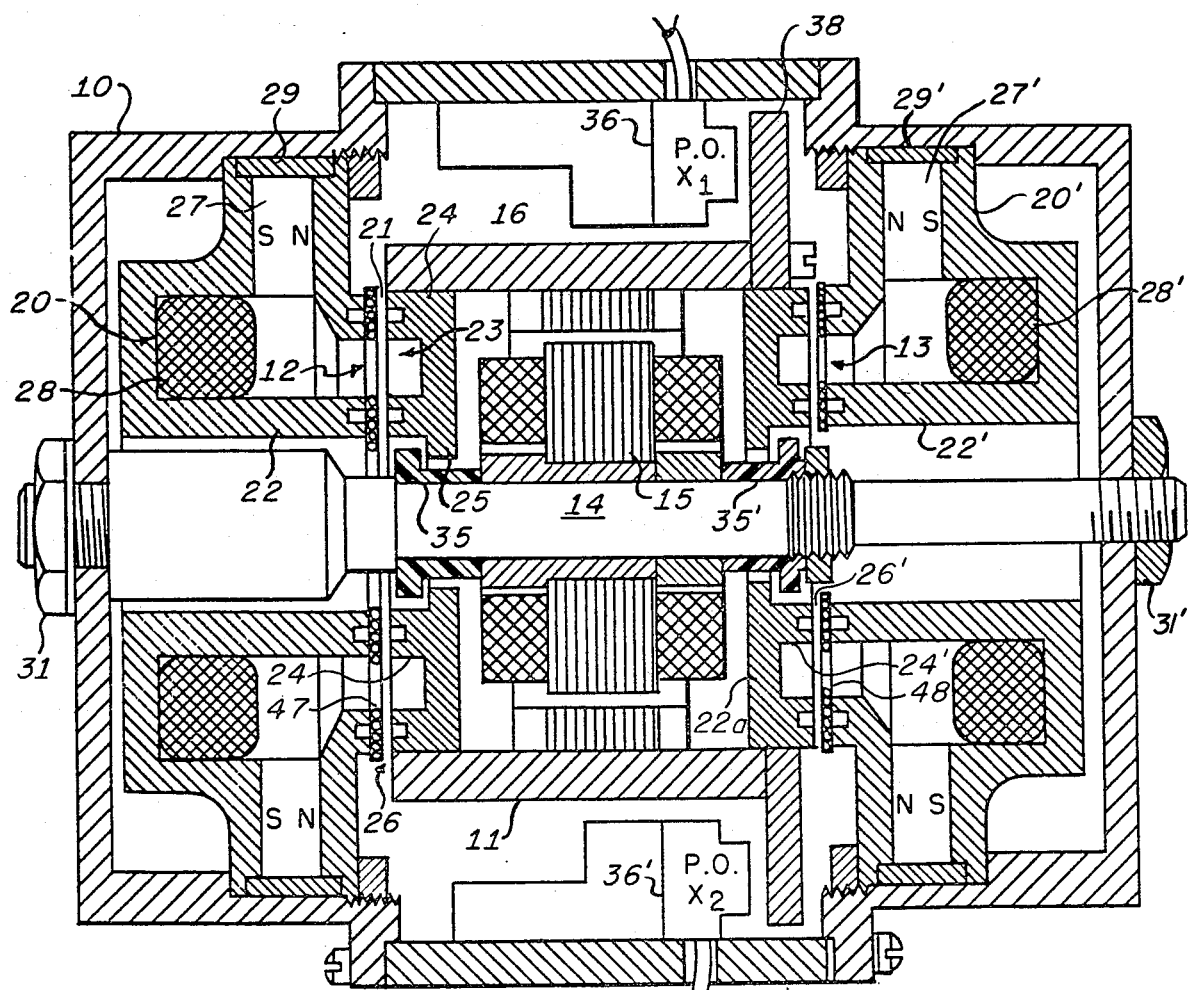
FIG. 2 is a detailed cross section view of a preferred embodiment of the present invention.

Referring now to FIG. 2, there is illustrated in cross-section a magnetically suspended gyroscopic force or torque balanced rate sensor constructed in accordance with the teachings of the present invention, the magnetic suspension of this configuration being of the radially passive-axially active type. The basic elements of the sensor comprise a cylindrical housing or casing 10 adapted to be strapped down to a vehicle or craft, a rotor 11 magnetically suspended by annular magnetic suspensions 12 and 13 to spin about a spin axis X and to tilt about orthogonal tilt axes Y and Z in response to craft tilt and hence housing tilt about these axes. Cylindrical housing 10 includes a central tie-rod 14 serving to support fixedly and centrally thereof the electric motor stator and stator winding 15 which cooperates with motor rotor stack 16 fixed to gyro rotor 11 for spinning gyro rotor 11 about spin axis X.

The magnetic suspensions 12 and 13 are identical and therefore only suspension 12 will be described in detail, the reference characters for corresponding elements of suspension 13 being primed. Suspension 12 comprises a soft iron core 20 of an annular, generally U-shaped cross-section, the horizontally or axially extending open ends thereof constituting radially spaced magnetizable poles 21 and 22. Secured on the end of rotor 11 is a corresponding soft iron core 23 of an annular, generally U-shaped cross-section, the horizontally or axially extending open ends thereof constituting magnetizable poles 24 and 25 and providing a return path for the magnetic flux. Core pieces 20 and 23 are dimensioned so as normally to face each other and define a pair of radially spaced annular magnetic gaps 26. Preferably, each pole face is provided with annular grooves which define sharp flux-concentrating ridges to enhance the radial stiffness of the suspension, as taught in the Sabnis patent. As also taught by Sabnis, core assembly 20 includes means for producing passive and active magnetic fluxes across gaps 26, such means including an annular permanent magnet 27 located in one of the arms thereof, preferably of the samarium cobalt type, and an annular electrical coil 28 located in the base of the U-shaped core. Permanent magnets 27, 27' are polarized in an axial direction as shown and poled so that the fluxes in gaps 26, 26' oppose each other. Core members 20, 20' are secured in housing 10 by suitable casing shoulders and ringscrew clamps, as shown. Also, since samarium cobalt magnetic material tends to be fragile, soft iron spacers 29, 29' are provided to protect magnets 27, 27' from the clamping forces. It will also be noted that gaps 26, 26' may be precisely adjusted by accurately determining the axial length of cylinder housing wall 30. The entire assembly is secured together by means of tie-rod 14 and securing nuts 31, 31'.

Permanent magnets 27, 27' generate a permanent or passive magnetic flux in opposite directions across gaps 26, 26' between pole pieces 21, 22 and 21', 22'. If the rotor is exactly equally spaced between fixed poles 21, 22, 21', 22', the opposed passive fluxes in gaps 26, 26' cause rotor 11 to be in a state of unstable equilibrium in the axial direction and in a state of stable equilibrium in the radial direction. The slightest axial disturbing motion of the rotor will cause it to accelerate axially toward one pole piece or the other, depending on the direction of the disturbing force. Suitable stops 35 between rotor 11 and fixed tie-rod 14 are provided and dimensioned to prevent the pole faces from actually contacting each other under this hard-over condition so that the axially stabilizing electromagnetic flux, now to be described, may be effective. Additionally, stops 35 may be fabricated of a suitable tetrafluoroethylene fluorocarbon polymer of the kind sold under the trade mark "Teflon", for example, thus serving as a touch-down bearing for rotor 11.

The electric coils 28, 28' when properly energized, produce an active electromagnetic flux across gaps 26, 26' to stabilize rotor 11 axially and centrally between poles 21, 22 and 21', 22', again as taught by Sabnis. This active magnetic flux is produced by a closed-loop servo system. For this purpose, means are provided for generating an electrical signal proportional to any force producing a change in the axial position of rotor 11 from its unstable equilibrium position, which signal is processed and amplified by suitable electrical circuits as will be described, and fed to coils 28, 28' to generate an axially passive flux which opposes such disturbing force and moves the rotor back to its equilibrium position, reducing the signal to zero. In the embodiment of FIG. 2, the signal generator means comprises two pairs of diametrically opposed proximeter sensors 36, 36' secured to housing 10 and generally in the X-Z plane and 37, 37' (not shown in FIG. 2), also secured to the housing 10 in the X-Z plane. These pick-offs cooperate with the annular flange 38 of rotor 11, as shown. Thus, axial motion of rotor 11 causes corresponding signals to be generated by all the pick-offs which will, through the electrical circuit and coils 28, 28' produce the aforementioned stabilizing passive flux.

Figure 4:
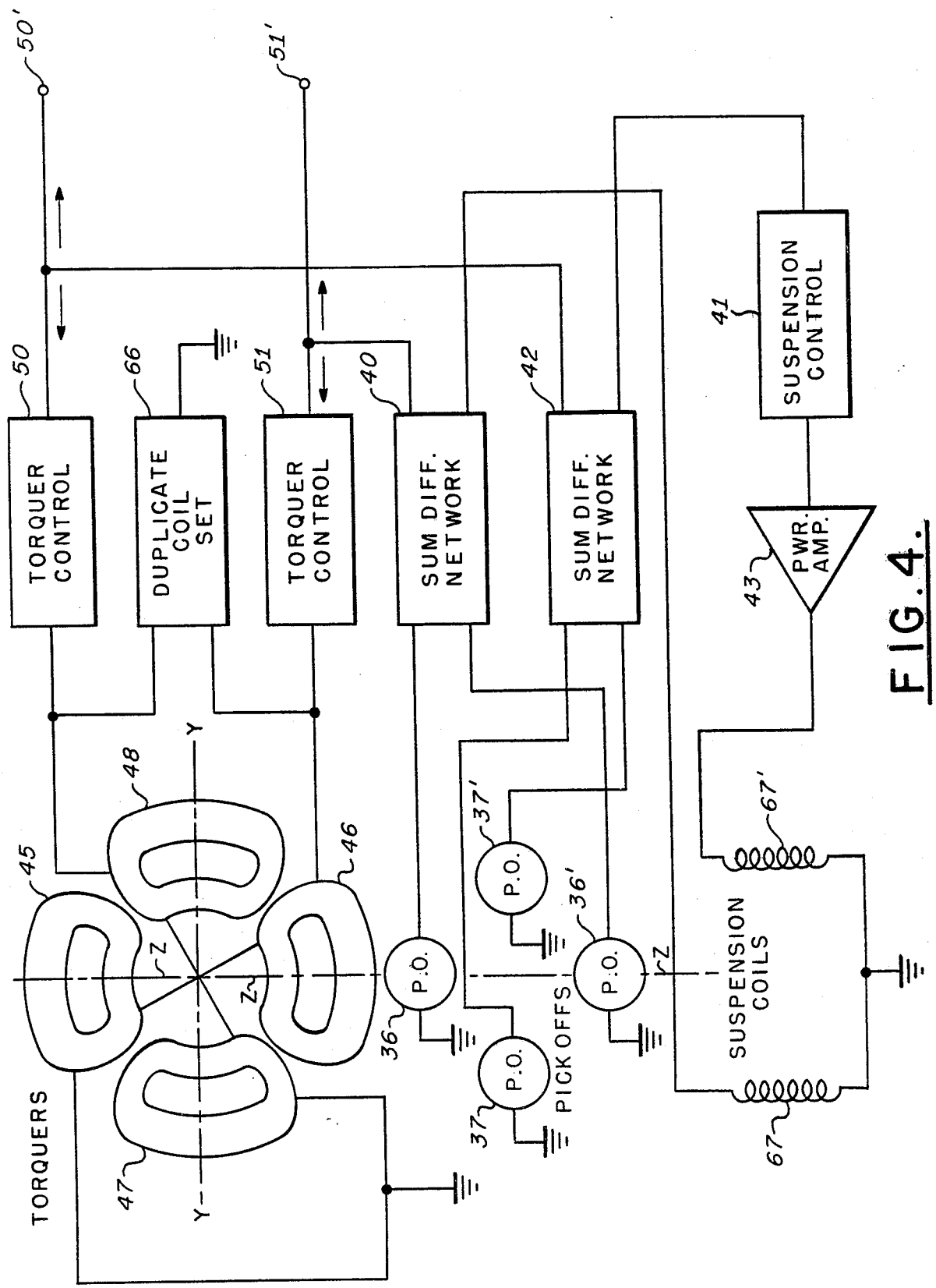
FIG. 4 is an electrical schematic diagram of a suitable control system for the sensor of FIG. 2.

A suitable electrical circuit for providing signal shaping and amplification is shown in FIG. 4 wherein the output of pick-offs 36, 36' is supplied to sum and difference network 40, the sum output of which is supplied to suspension control circuits 41. Similarly, the sum output of sum and difference network 42 responsive to proximity pick-offs 37, 37' is also supplied to control circuit 41. This circuit may include conventional signal averaging circuits or mid-value selection circuits for providing a single signal proportional to the average of mid-value of the departure of rotor 11 from its axial stable position. The output of the control, which may be of the character described in the referenced Sabnis patent, is applied to power amplifier 43 and then to coils 67, 67' to provide the active stabilizing magnetic flux.

Figure 3:
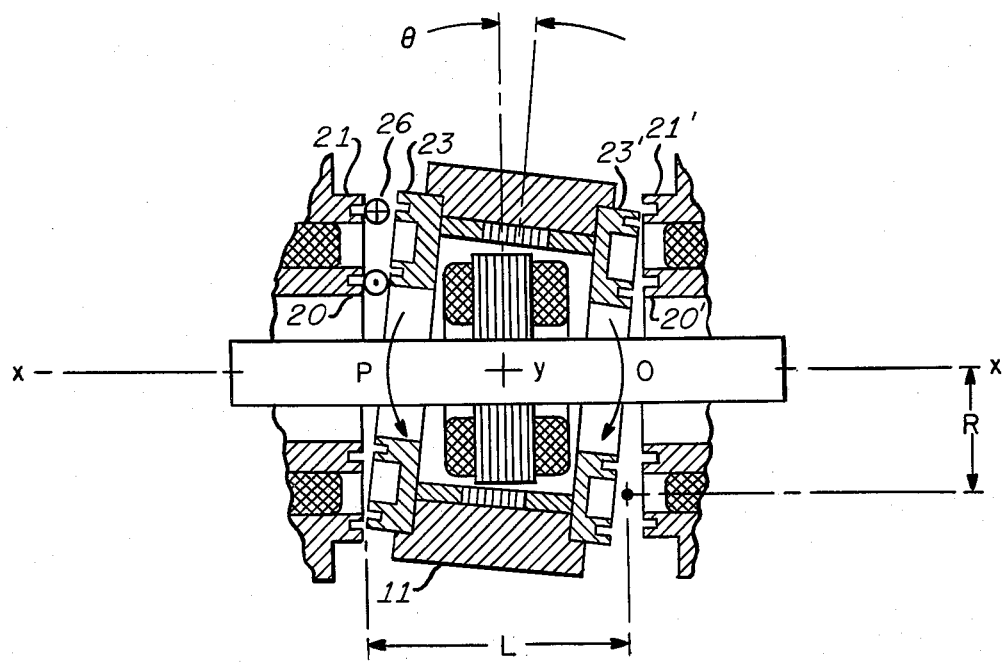
FIG. 3 is a partial view of FIG. 2 useful in explaining the operation of the invention.

As is well known to those familiar with the art of torque feed back gyroscopic rate sensors, it is desired that the coupling between housing 10 and rotor 11 induce zero torque on the rotor upon relative tilt between the two so that the only restoring torque supplied to rotor 10 is that due to the feed back torque, in which case that torque is a precise measure of the rate of change of such relative tilt and hence is a precise measure of the rate of rotation of housing 10 and hence of the craft on which it is strapped. If the torque is provided by an electric torque motor, the electric current supplied to the torque motor is also a measure of the rotation rate. Since the time constant of the torque feed back control loop can be made very short and the gain thereof very high, the actual movement of the housing relative to the rotor is exceedingly small, about a few seconds of arc. According to the present invention, and in accordance with Equation (12) above, the desired zero restraint or stiffness of the housing-rotor coupling is obtainable with a magnetically suspended rotor by the proper dimensioning of the suspension elements and the effective magnetic gaps. In the FIG. 2 embodiment, the radial-to-axial stiffness constant is about 8, yielding an L/R ratio of about 2:1. Hence, as illustrated schematically in FIG. 3, the mean effective axial span between the gaps 26, 26' is designated L while the mean effective radius of those gaps is designated R. In FIG. 3, housing 10 and stator core elements 20, 20' have been illustrated as being subjected to a tilt angle $\theta$ relative to rotor 11, and illustrating angle $\theta$ being greatly exaggerated in order to demonstrate graphically the balancing of the axial and radial magnetic forces which results in zero deflection and zero restoring stiffnesses about the Y axis. They will, of course, be the same about the Z axis, by symmetry. It will be noted that as the upper right and lower left pole faces of the rotor move toward their corresponding adjacent fixed pole faces, as the upper left and lower right pole faces move away from their fixed pole faces, an overturning magnetic torque, designated by arrow O, about axis Y is created by the axial passive or permanent magnet flux, which torque increases as the poles approach each other. However, it will also be noted that, due to the same rotation, all pole faces of the rotor are radially displaced from their corresponding fixed pole faces, developing a counter magnetic torque, designated by arrow P, about the axis Y. The predetermined L/R ratio, as defined by Equation (12), results in the magnitude of the two torques O and P to balance each other. Without further tilting or restoring controls, rotor 11 will remain where it is; that is, rotor 11 is neutrally suspended relative to housing or casing 10. It will also be noted that since the mean axial position of rotor 11 has not changed, the active magnetic field will not be generated. In practice, both the passive and active fields will be produced; however, note that the active field is uniformly distributed across all gaps and will therefore not to any significant extent affect any unbalance of the angular overturning and restoring torques O and P.

The apparatus or means for supplying the restoring precessional torque required to cause rotor 11 to follow any angular rotation of the craft, and hence case 10, will now be described. While other suitable electric torquing devices may be used, there is illustrated in FIG. 2 a unique torquer which is the subject of the aforementioned C. G. Sutter patent application. Basically, the Sutter torquer makes use of the already existing magnetic field of the magnetic suspension. Referring again to FIGS. 2 and 3, the unique torquer comprises at least one set of four coils 45, 46, 47, and 48, each coil comprising a flat, preferably single layer of very fine insulated wire so formed that their outer and inner accurate sectors, correspond generally in radius to the radii of the pole faces 21 and 22, respectively. The circumferential extent of the coils may be as near ninety degrees as possible to maximize coupling with the suspension magnetic fields across the gaps. Coils 45 and 46 are secured, as by cementing, to fixed pole faces 21 and 22 and are located so that they are bisected by the X-Z plane, while the similar coils 47 and 48 (not shown in FIG. 2) are mounted in pole faces 21, 22 so that they are bisected by the X-Y plane. Coils 45 and 46 are electrically connected in series, as shown in FIG. 4, and may be referred to as the Y-axis torquer coils, while coils 47 and 48 are similarly connected and may be referred to as the Z-axis torquer coils.

The torquer operation is as follows, reference being made primarily to FIG. 2. Assume that the permanent magnetic flux circulates clockwise from the north pole of magnet 27, out of pole face 21, across the upper gap 26 through the upper pole face of keeper 23, out of the lower pole face of keeper 29, back across lower gap 26 into lower pole face 22 and so back to the south pole of magnet 27. Thus, the upper portion of coil 45 lies in a magnetic field extending to the right across upper gap 26 and the lower portion of coil 46 lies in a magnetic field extending to the left across lower gap 26. Now, assume that a current is applied to a coil coinciding in a sense that it flows through the upper coil portion toward the viewer and through the lower coil portion away from the viewer as indicated by the conventional arrow heads in FIG. 3. The magnetic field produced by this current flow through the coil portions interacts with the permanent magnet fields in the upper and lower gaps 26 between poles 21 and 22 effectively to distort these fields downward as viewed in the figure. Therefore, the upper and lower poles of rotor core 20 will attempt to align themselves with this distorted field and in doing so will produce a force or torque counterclockwise on rotor 11 about the Y-axis. The companion lower coil 47 provides a like torque or force on lower rotor poles 24 about the Y-axis which will be in the same direction as that in upper poles core 20. The two torques add or augment each other to produce a resultant counterclockwise torque about the Y-axis. Reversing the coil current will, of course, operate to produce a clockwise torque about the Y-axis. Z-axis torquer coils 47, 48 operate in the same manner to produce reversible torques about the Z-axis.

In describing the operation of the sensor embodiment of FIGS. 2, 3, and 4, assume the sensor is strapped to the aircraft such that its spin axis X-X is parallel with the aircraft fore-aft axis and the craft rotates about its yaw axis and hence the sensor case 10 rotates about its Z-axis. Initially, the rotor, through its gyroscopic inertia, will tend to hold its position in space and the relative positions of rotor and case will be as shown in FIG. 3, although the axes X and Z axes will be interchanged. This motion generates a signal in proximeters 36, 36' (FIG. 4) applied to sum and difference network 40 and the difference output thereof will be applied to torquer control 51 which may be of the pulse-width type described in U.S. Pat. No. 4,222,270, issued Sept. 16, 1980 in the name of A. R. Allen and assigned to Sperry Corporation. The output of the torquer control 51 is a controlled current proportional to the pick-off signals which is supplied to Y-axis torquer coils 45, 46 to produce a torque about the Y-axis, which torque, through gyroscopic precession, will result in rotation of the gyro about the Z-axis in a sense to reduce the pick-off signals to zero. If the craft continues to rotate about its Z-axis, a continuous current will be supplied to the torquers to keep precessing the gyro so that it keeps up with such turning. Thus, the current supplied to the torquer is proportional to the rate at which the craft is turning about the Z-axis. Such an output is available at terminal 51. Operation will be analogous for turns about the Y-axis with respect to proximeters 37, 37', sum and difference network 42, torquer control 50, and torquer coils 47, 48. Such feed back currents precisely represent the craft rate of turn because no other torques are being applied to the gyro due to the non-contacting, neutral or zero stiffness characteristics of the magnetic suspension of the present invention. The invention displays versatility, including utility in various types of strapped down inertial systems, also including those in which the gyro spin axes are skewed relative to the aircraft axes to provide redundancy as taught in the M. S. Klemes, D. H. Duncan U.S. Pat. No. 4,212,443 for a "Strapped Down Attitude and Heading Reference System for Aircraft Employing Skewed Axis 2-Degree-of-Freedom Rate Gyro", assigned to the Applicant's assignee, and issued July 15, 1980.

The output of sum and difference network 42 will also be amplified by power amplifier 43 and supplied in series through the suspension coils 67, 67'.

Figure 5:
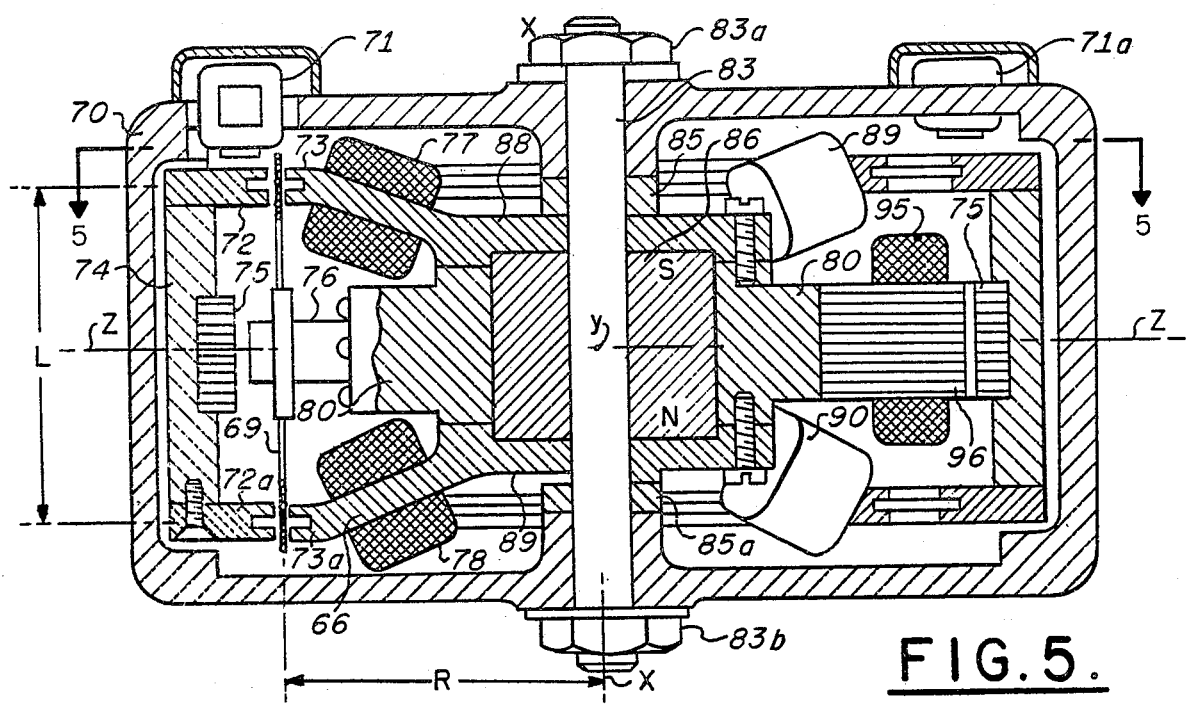
FIG. 5 is a plan view of a radially active, axially passive embodiment of the invention in cross section taken along planes 5—5 of FIG. 6.
Figure 6:
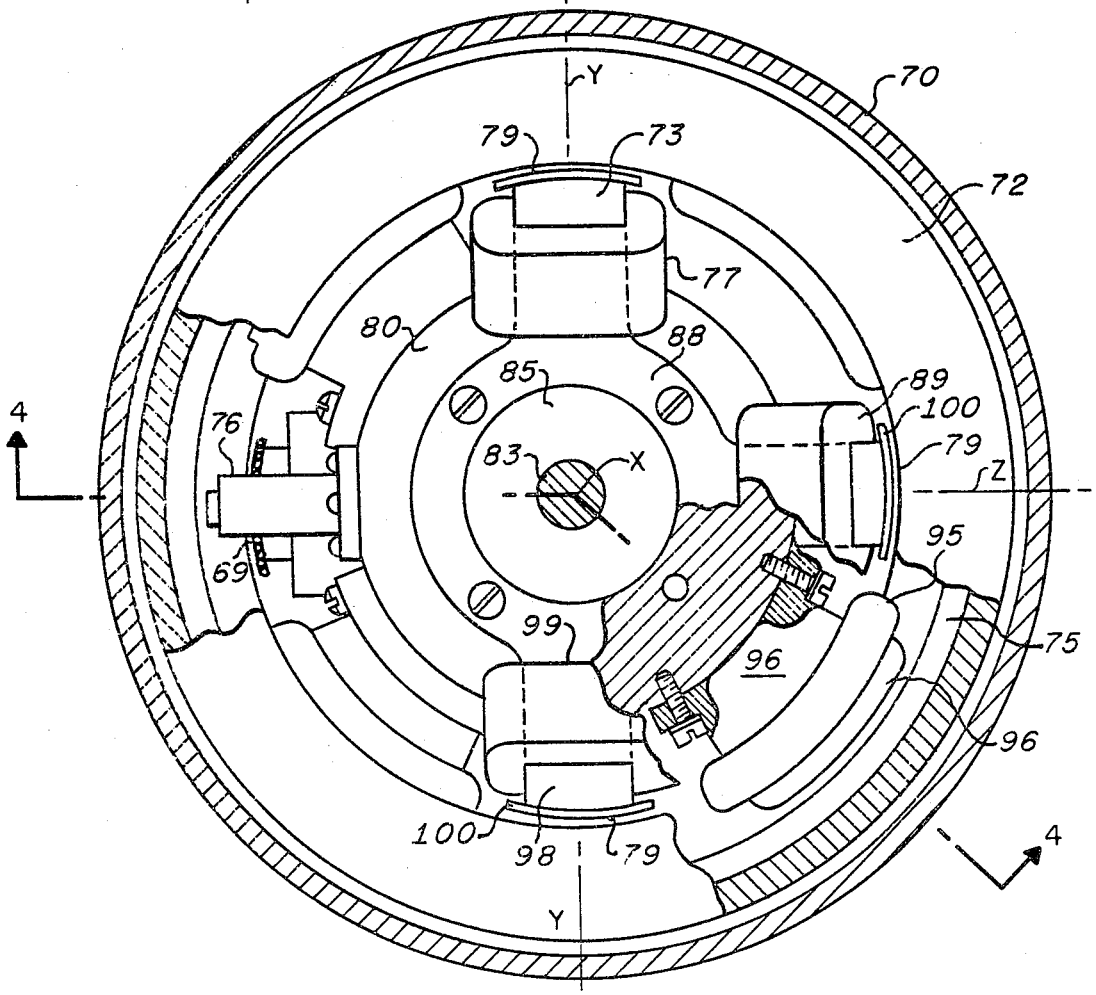
FIG. 6 is an elevation view partial in cross section taken along the line 6—6 of FIG. 5.

It has been noted that the invention may be employed in rate gyroscopes having a radially passive, axially active magnetic suspension as in FIG. 2, but it also finds equal success in use in gyros using radially active, axially passive magnetic suspensions of the general type disclosed in the above referenced Studer patent. This modification of the present invention will be discussed in connection with FIGS. 5 through 8. The generally symmetric instrument components are similarly supported in hollow cylindrical casing 70 having a central shaft or tie-rod 83 affixed generally along its axis of symmetry by suitable fasteners 83a, 83b, upon which shaft 83 substantially all of the fixed elements of the sensor are supported. The rotor drive motor comprises a plurality of conventional segmented stator members 96 and stator coils 95 which are affixed directly to a central apertured spider element 80, as seen in FIGS. 5 and 6. The central opening of spider element 80 accommodates annular hollow cylindrical magnet 86, polarized as shown for providing the passive rotor suspension magnetic flux. Magnet 86 fits closely over shaft 83 and is clamped thereon by and between magnetically permeable spider elements 88, 89 of mirror image configuration. The spiders supporting magnet 86 are so dimensioned that a sufficient but minimum damping load is placed on the fragile samarium cobalt magnet. Thus, elements 95, 96, 80, 86, 88 and 89 form integrated parts of the stationary portion of the instrument. Spacers or shims 85 may be provided to assure proper spacing of these elements.

The central spider element 80 also serves to support quadrantally opposed radially extending proximity pick offs such as pick off 76 that senses any radial motion of rotor 75 along orthogonal axes. A second set of redundant pick offs is disposed at right angles to the axis of pick offs 76. These pairs of pick offs sense any radial motion of the instrument rotor along the X and Y axes and correspond to pick-offs 36, 37 of the embodiment of FIG. 2 in their function of detecting axial motion of rotor 11.

Upper and lower spiders 88 and 89 include diametrically disposed radial arms 66 aligned with the Y-Z axes to form the fixed, orthogonal magnetic poles for the magnetic suspension. On each arm of upper spider element 88, there is supported one of four coils such as coils 77, 99, two other such coils being located on the ninety degree spaced, radial arms; these coils providing the active radial stabilizing flux for the rotor suspension. Likewise, on the lower spider element 89 similar coils 78, 90 are provided. Thus, in place of the continuous annular stator magnetic suspension pole systems of FIG. 2, the instrument of FIGS. 5 and 6 uses four equiangularly disposed arcuate pole pieces. Such a configuration is entirely equivalent in operation to that of the annular ring bearing system of FIGS. 1 and 2.

The rotor of the instrument includes a hollow cylinder 74 of magnetically permeable material which represents the major part of the rotor inertia. The inner surface of cylinder 74 is arranged to support laminated rotor drive motor element 75. At the flat ends of cylinder 74 are affixed a pair of ring shaped magnetic pole elements 72, 72a having ridged pole faces for flux concentration purposes, each facing and cooperating with the matching ridged pole faces 73, 73a of the stator spiders to form the magnetic suspension magnetic flux gaps 79. Again, in accordance with the present invention, the mean effective distance or span L between magnetic circuit gaps 79, bears the characteristic ratio to R, the mean effective radius of the gaps 79 with respect to the rotor spin axis X. The dimension L may be readily designed so that a radio L/R can always be predetermined for which angular stiffness to rotor rotation about axes Y and Z is zero, that is $K_\alpha = 0$, or substantially zero.

While in FIG. 2, the pick-offs 36—36' serve the dual function of detecting both axial and angular motion of rotor 11; in the embodiment of FIGS. 5 and 6 separate pick-offs are used for each function. As stated, the proximeter 76 provides the initiating signal for the magnetic suspension servo loop, whereas separate pick-offs are used for the angular or torque feed back control loops. Thus, conventional inductive tilt pick-offs 71, 71a are diametrically disposed in the X-Z plane, being suitably supported on housing 10 for detecting angular deflection of the rotor 75 about the Y-axis. The Z-axis tilt pick-offs are the same and are similarly mounted on the housing to detect angular deflection of the rotor about the Z-axis. Thus, separate transducers are supplied in the second embodiment of the invention for use as the initiating signals for the torque feed back servo loop. Circuits similar to those of FIG. 5 may be employed, so that detailed illustration and discussion thereof are not deemed necessary.

Figure 8:
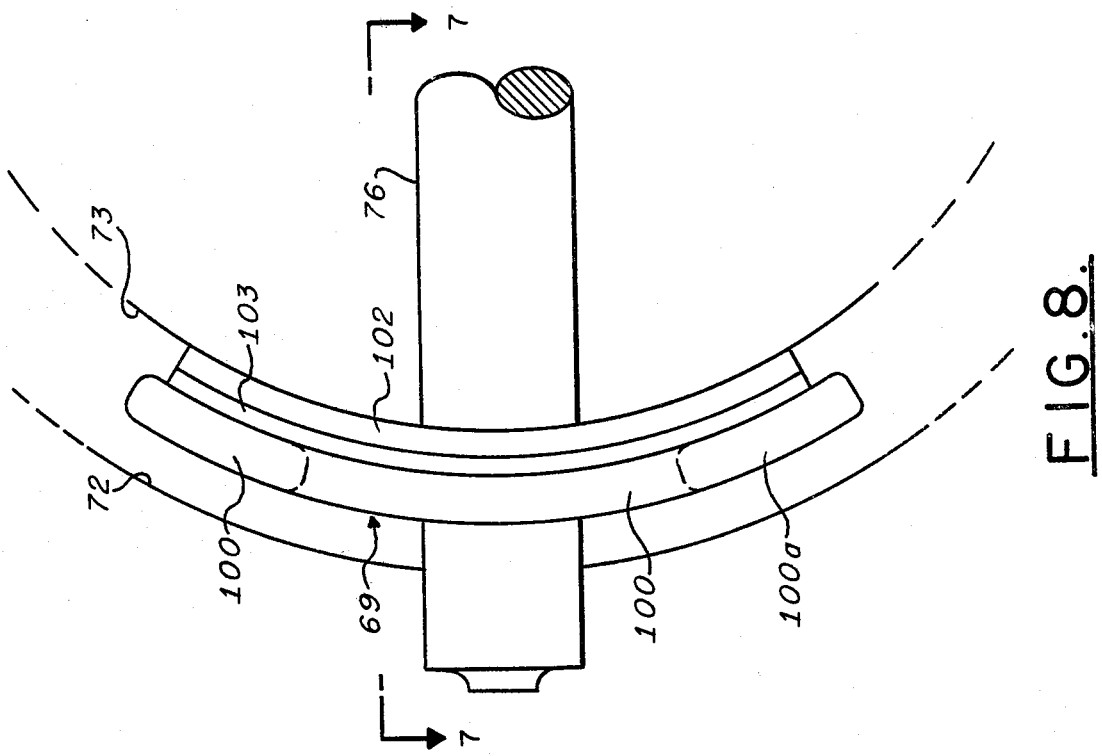
FIG. 8 is an elevation view of the torquer device taken along the lines 8—8 of FIG. 7.
Figure 7:
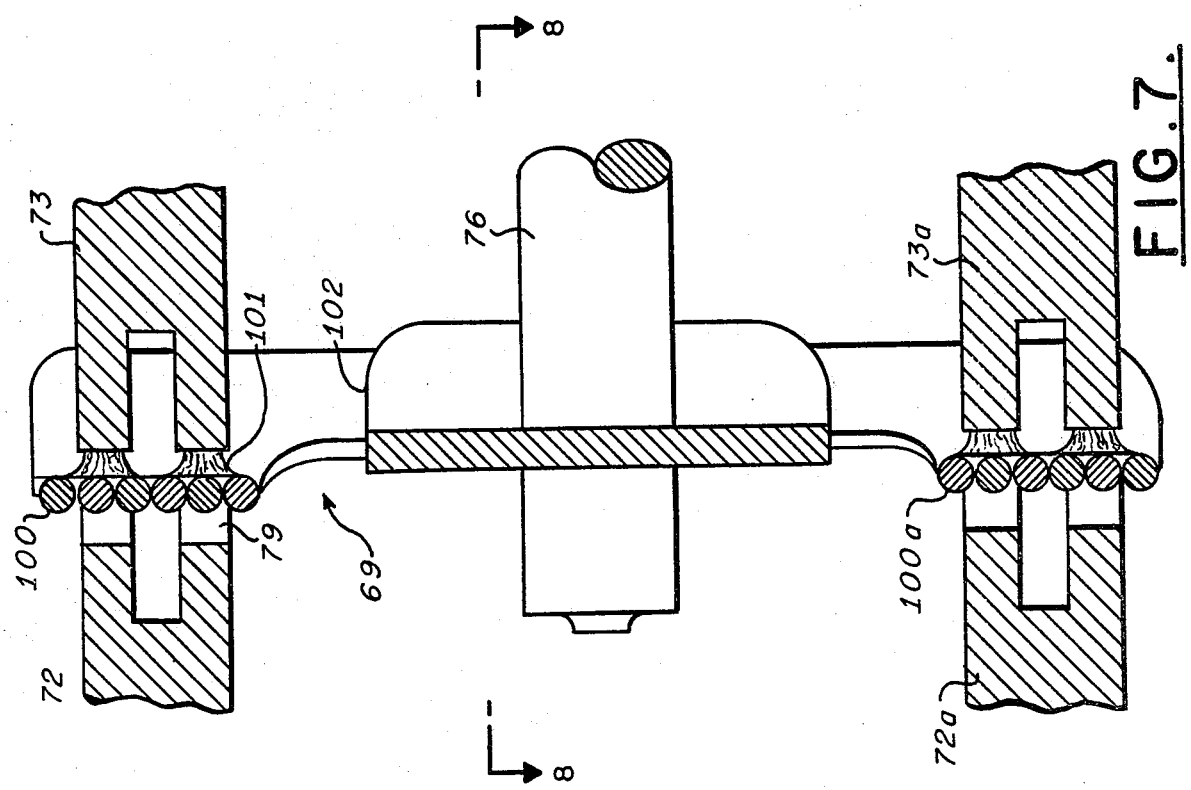
FIG. 7 is a detailed view, partly in cross section, of a torquer device employed in FIGS. 5 and 6, taken along the line 7—7 of FIG. 8.

The unique torquer discussed in connection with FIG. 2 is suitably modified for use in the modification of FIGS. 5 and 6. As in FIG. 2, the arcuate coils 100 of FIGS. 5 and 6 are located in thin cylindrical magnetic circuit gaps 79 between the stator pole piece 73 and rotor poles 72, for example. As shown in more detail in FIGS. 7 and 8, it will be noted that each torquer coil winding 100 is preferably one wire thick and is generally rectangular in shape. Two such coils are required, one for each axis but preferably four such torquer coils are employed for increased gain and redundancy. One of these, such as coil 69 in FIG. 5 is shown in FIGS. 7 and 8 for applying torque to rotor 75 about the Y-axis. Another or second diametrically opposite coil pair spaced ninety angular degrees from the first pair is provided for torquing the rotor about its Z-axis. Each torquer coil is constructed similarly to coil 69 shown in FIGS. 7 and 8. Coil 69 is supported on a suitable arcuate mount 102 fixed to radially extending proximity pick-off 76. Curvature of coil 69 and its support mount 102 matches that of spider pole piece 73 so that coil 69 may be readily affixed to support mount 102 and the pole face by a suitable layer of adhesive 101. In this manner, each of the four proximity pick-offs serves its primary function while cooperating in the support of an associated torquer coil.

The operation of the torquer of FIGS. 5 to 8 is generally the same as that of FIG. 2. The difference is that, in FIG. 2, two serially connected torquer coils are used, one for the upper pair of poles and one for the lower pair of poles. Since in the embodiment of FIGS. 5 and 6 there are only two poles per torquer axis, only one coil is required. Upon tilt of the casing or housing 70 relative to rotor 75, the tilt is detected by angle pick-offs 71, 71a whose output signal is processed and amplified as in FIG. 4 and a proportional current is applied to coil 99, for example. As in FIG. 2, the magnetic flux field about the upper and lower coil portions produced by this current reacts with the magnetic suspension magnetic flux field across gap 79 to distort the latter upward or downward, as viewed in FIGS. 5 and 7, so that the rotor poles in attempting to follow this distorted field generate a torque on rotor 75 about the Y axis proportional to the current flowing through the coil.

While the invention has been described in its preferred embodiments, it is to be understood that the words which have been used are words of description rather than of limitation and that changes may be made within the purview of the appended claims without departing from the true scope and spirit of the invention in its broader aspects.

I claim:

1. A free rotor gyroscopic rate sensor comprising: housing means having a housing axis,
    generally cylindrically rotor means adapted to spin about a spin axis in said housing normally coincident with said housing axis,
    magnetic suspension means coupled between said housing means and said rotor means for contactlessly suspending said rotor means in said housing means with said rotor axis normally coincident with said housing axis, said magnetic suspension means comprising,
        at least one pair of axially spaced magnetic flux gaps formed by at least one pair of magnetically permeable pole pieces on said housing means radially spaced from said spin axis and a cooperating pair of correspondingly axially and radially spaced pole pieces on said rotor means, and
        means for producing passive and active magnetic fluxes between said pole pieces, said active and passive magnetic fluxes supporting said rotor means in unstable equilibrium in a first direction relative to said spin axis and said passive magnetic flux supporting said rotor means in stable equilibrium in a second direction relative to said spin axis at right angles to said first direction,
    motive means coupled between said housing and rotor means for spinning said rotor means about said spin axis,
    the mean axial distance between said axially spaced gaps bearing a predetermined ratio to the mean radius of said spaced gaps, such that in response to relative tilting of said rotor spin axis and said housing means, the passive magnetic flux force tending to retain said rotor means in stable equilibrium in said second direction is substantially balanced by the passive magnetic flux force tending to destabilize said unstable equilibrium in said first direction.

2. Apparatus as defined in claim 1 further comprising, pick-off means for sensing and providing a signal proportional to said relative tilt, and
    torquer means responsive to said tilt signal tending to reduce said tilt signal to zero.

3. Apparatus as defined in claim 2 wherein said predetermined ratio is defined as:

$$\frac{L}{R} = \left[ 2\frac{4}{\pi} - 1 \frac{K_u}{K_r} \right]^{\frac{1}{2}}$$

where

L = the mean effective axial distance between said magnetic gaps,

R = the mean effective radius of said magnetic gaps, $K_u$ = the magnetic stiffness in said first direction, and $K_r$ = the magnetic stiffness in said second direction.

4. Apparatus as described in claim 3 wherein said predetermined ratio is on the order of 2:1.

5. Apparatus set forth in claim 1 wherein said active magnetic fluxes stabilize said rotor means in said gaps in an axial direction and said passive magnetic fluxes stabilize said rotor means in said radial direction.

6. Apparatus as set forth in claim 1 wherein said active magnetic fluxes stabilize said rotor means in a radial direction and where said passive magnetic fluxes stabilize said rotor means in an axial direction.

7. A free rotor gyroscopic rate sensor including:
housing means having a housing axis,
generally cylindrical rotor means having a spin axis normally coincident with said housing axis,
magnetic suspension means for suspending said rotor means in normally non-contacting relation within said housing means and including:
at least one pair of annular, axially spaced magnetic flux gaps formed between a first pair of annular magnetically permeable pole pieces on said housing and a corresponding second pair of cooperating pole pieces on said rotor,
means for producing passive magnetic fluxes between said first and second pair of magnetically permeable pole pieces and for producing destabilizing and stabilizing forces on said rotor means in axial and radial directions, respectively, and
motive means for spinning said rotor means with respect to said housing means normally about said housing axis,
the mean effective axial distance between said axially spaced gaps having a predetermined ratio to the mean effective radius of said spaced gaps such that, in response to tilting of said rotor means spin axis relative to said housing axis, the passive magnetic forces tending to stabilize said rotor means radially of said spin axis are substantially balanced by the passive magnetic forces tending to destabilize said rotor means axially of said spin axis.

8. A free rotor gyroscope rate sensor including:
housing means having a housing axis,
generally cylindric rotor means having a spin axis normally coincident with said housing means axis,
magnetic suspension means for suspending said rotor means in normally non-contacting relation within said housing means and including:
a first pair of annular magnetically permeable pole pieces on said housing means, and
a second pair of annular magnetically permeable pole pieces on said rotor means,
said first and second pairs of annular magnetically permeable pole pieces forming annular spaced apart gaps,
the mean effective axial distance between said annular spaced apart gaps having a predetermined ratio to the mean effective radius of said annular spaced apart gaps such that the relative magnetic stiffnesses in the axial and radial direction across said gaps balance each other upon relative angular rotations of said rotor means normal to said spin axis.

9. Apparatus as described in claim 8 wherein said predetermined ratio is substantially 2:1.

* * * * *